US006081108A

United States Patent [19]

Marshall

[11] Patent Number: 6,081,108

[45] Date of Patent: Jun. 27, 2000

[54] LEVEL SHIFTER/AMPLIFIER CIRCUIT

[75] Inventor: Andrew Marshall, Dallas, Tex.

[73] Assignee: Texas Instruments Incorporated, Dallas, Tex.

[21] Appl. No.: 09/211,617

[22] Filed: Dec. 15, 1998

Related U.S. Application Data

[60] Provisional application No. 60/068,044, Dec. 18, 1997.

[51] Int. Cl.[7] .................... G05F 3/20; G06F 3/26

[52] U.S. Cl. .................... 323/315; 323/314; 327/108

[58] Field of Search .................... 323/315, 313, 323/314; 363/60; 327/108, 562, 475

[56] References Cited

U.S. PATENT DOCUMENTS

| | | | |
|---|---|---|---|
| 4,525,663 | 6/1985 | Henry | 323/313 |
| 4,663,701 | 5/1987 | Stotts | 363/60 |
| 5,686,824 | 11/1997 | Rapp | 323/313 |
| 5,694,031 | 12/1997 | Stanojevic | 323/313 |

*Primary Examiner*—Adolf Deneke Berhane
*Assistant Examiner*—Rajnikant B. Patel
*Attorney, Agent, or Firm*—Mark E. Courtney; Wade James Brady, III; Frederick J. Telecky, Jr.

[57] ABSTRACT

The invention is a circuit for converting a voltage which is the difference between a supply voltage voltage $V_{cc}$ and input voltage $V_{in}$, to a voltage which is the difference between an output voltage $V_{out}$ and a reference Gnd, comprising. A first resistor $R_1$ for producing a voltage $V_{In\text{-}mirror}$ is used in conjunction with $V_{cc}$. $V_{In\text{-}mirror}$ is a mirror value of $V_{in}$. A second resistor $R_2$ is used, across which, the output or concerted voltage $V_{out}$ is produced. A first mirror circuit cascoded with a second mirror circuit, is connected between the first resistor $R_1$ and the second resistor $R_2$ for producing currents in the first and second resistors to provide output voltage $V_{out}$ across $R_2$.

15 Claims, 3 Drawing Sheets

LEVEL SHIFTER/AMPLIFIER CIRCUIT

This application claims priority under 35 USC § 119(e)(1) of provisional application number 60/068,044 filed Dec. 18, 1997.

FIELD OF THE INVENTION

The invention relates to integrated circuit voltage shifting circuits, and more particularly to a circuit for detecting a small voltage difference between the high voltage supply and a threshold voltage just below just below the high voltage supply in an integrated circuit, and converting the small voltage difference to a proportional voltage above ground.

BACKGROUND OF THE INVENTION

Voltage level shifter circuits are commonly implemented using feedback amplifier topologies. Current mirror circuits have been used in various circuit implementations. A current mirror circuit is a current input/output device which, ideally, has zero input impedance and infinite output impedance so that the current output of a mirror circuit remains a fixed function of current input. A general background discussion of conventional mirror circuits is set forth in U.S. Pat. Nos. 5,311,115 and 5,515,010, which are incorporated herein by reference.

SUMMARY OF THE INVENTION

The invention is a circuit and method for rapidly shifting voltage differences between an input reference voltage and a supply rail voltage to a voltage close to the ground rail for further signal processing. This voltage can be smaller, larger or the same depending upon the circuit design, but is always intended to be proportional over the range of operation required.

The circuit converts a voltage which is the difference between a supply voltage voltage $V_{cc}$ and input voltage $V_{in}$, to a voltage which is the difference between an output voltage $V_{out}$ and a reference Gnd. A first resistor $R_1$ for producing a voltage $V_{In\text{-}mirror}$ is used in conjunction with $V_{cc}$, where $V_{In\text{-}mirror}$ is a mirror value of $V_{in}$. A second resistor $R_2$ is used, across which, the output voltage $V_{out}$ is produced. A first mirror circuit is connected with a second mirror circuit between the first resistor $R_1$ and the second resistor $R_2$ for producing currents in the first and second resistors to provide the output voltage $V_{out}$ across $R_2$.

DESCRIPTION OF A PREFERRED EMBODIMENT

Figure 1:
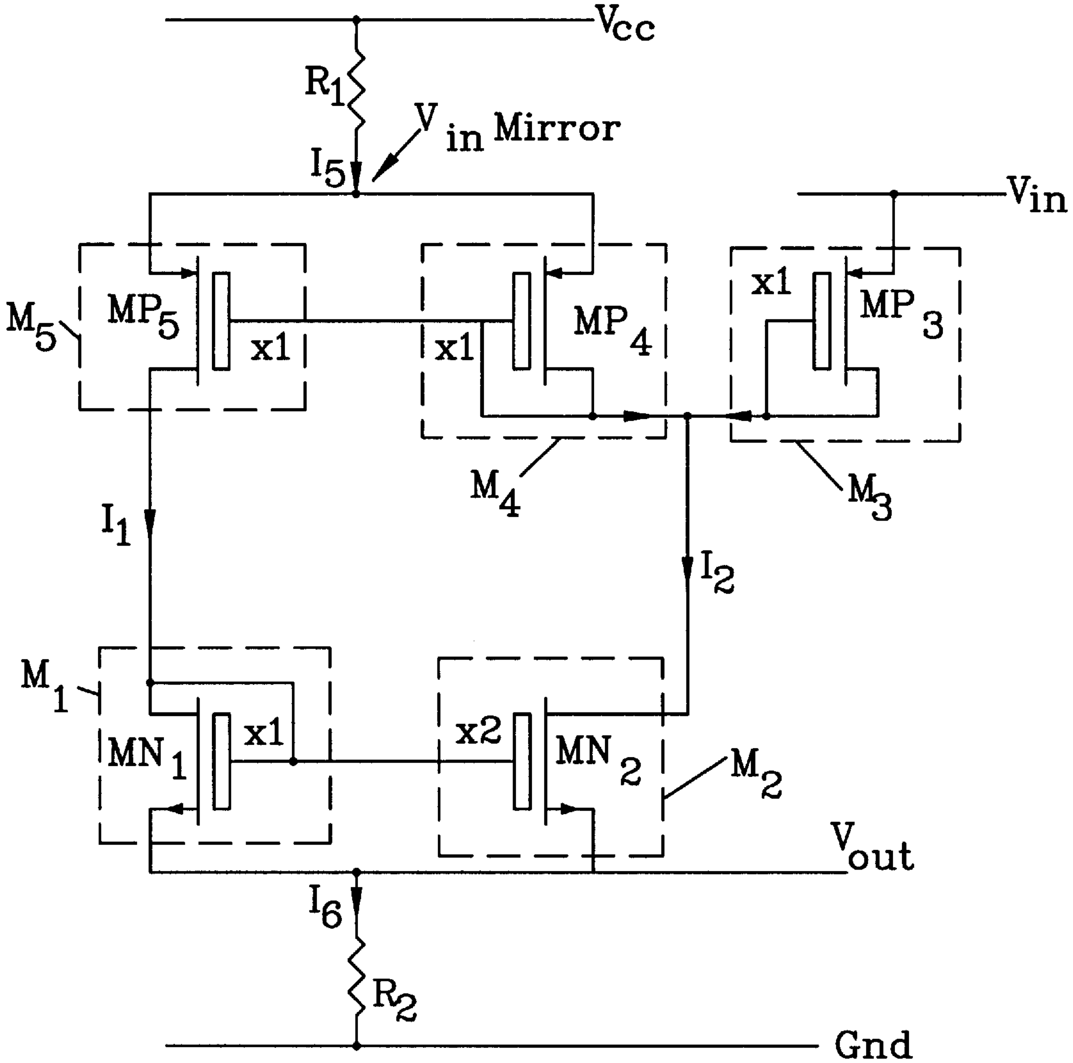
FIG. 1 shows a basic circuit illustrating a circuit implementation of the present invention.

The invention is a circuit and method of detecting a voltage threshold of a voltage just below the high voltage supply in an integrated circuit. It is difficult to accurately design a voltage reference and threshold detection circuit close to the supply voltage when the supply voltage is several 10's of volts. The circuit in FIG. 1 was developed to shift an input voltage having a value close to the supply voltage in magnitude to a voltage referenced to ground. FIG. 1 shows a circuit utilizing mirror circuits that detects a threshold voltage $V_{in}$ that has a value just below the high voltage supply $V_{cc}$ in an integrated circuit and generates a proportional reference voltage $V_{out}$ above ground. It is difficult to generate an accurate reference voltage and compare it to an input voltage closed to supply voltage $V_{cc}$. Therefore, the reference voltage $V_{out}$ is generated to provide an accurate representation of $V_{in}$. The circuit of FIG. 1 converts a small voltage difference (around 0.3 V) between the $V_{cc}$ supply (for example 35 V) and input $V_{in}$, to a proportional voltage above ground. This can be readily compared to a precision reference voltage generated with low voltage components close to ground potential.

MN1 and MN2 are NMOS devices with MN1 diode connected, the gate of MN1 connected to the drain of MN1. MN2 has its gate connected to the gate to MN1, and its drain connected to the drains of MP3 and MP4. MP3 and MP4 are diode connected with the gate of each device connected to its respective drain. The current mirror formed by MN1 and MN2 in FIG. 1 requires MN2 to pull current from MP3 and MP4. Current through MP4 is mirrored in MP5, which supplies the current for MN1. Balance is arranged at the point where $V_{in}$ and $V_{inmirror}$ are equal voltages. This defines the current $I_5$ through $R_1$, which in turn defines the current through $R_2$. MP3 and MP4 provide the current $I_2$ that flows through MN2. Both MP3 and MP4 have x1 gain while MN2 has x2 gain, or the sum of currents through MP3 and MP4. Current $I_1$ flows through MN1 and MP5, where MN1 and MP5 have x1 current gain. $I_6$, from M1 and M2 flows through $R_2$.

The operating conditions for the circuit of FIG. 1 are as follows.

At equilibrium, $I_6=3I_1$ and $I_5=2I_1$. $I_5$ is determined by $V_{inmirror}=V_{in}$. Therefore, $R_1$ and $R_2$ are chosen to be the same type of semiconductor resistors, for example, polysilicon, Therefore, $V_{out}=3/2 R_2/R_1 V_{in}$.

As an example, if a threshold voltage $V_{out}=2.4$ volts is required, and a $V_{in}$ threshold of 0.2 v is required, then $2.4/0.2\times 2/3=R_2/R_1=8$. Therefore, only matching of R1 and R2 is important, not their absolute values. If integrated resistors of the same type are used, and of a type where resistance is invariant with supply voltage (eg polysilicon resistors), the ratio of current through $R_1$ and $R_2$, and resistor values can be used to gain up (or attenuate) the $V_{cc}-V_{in}$ voltage.

Figure 2:
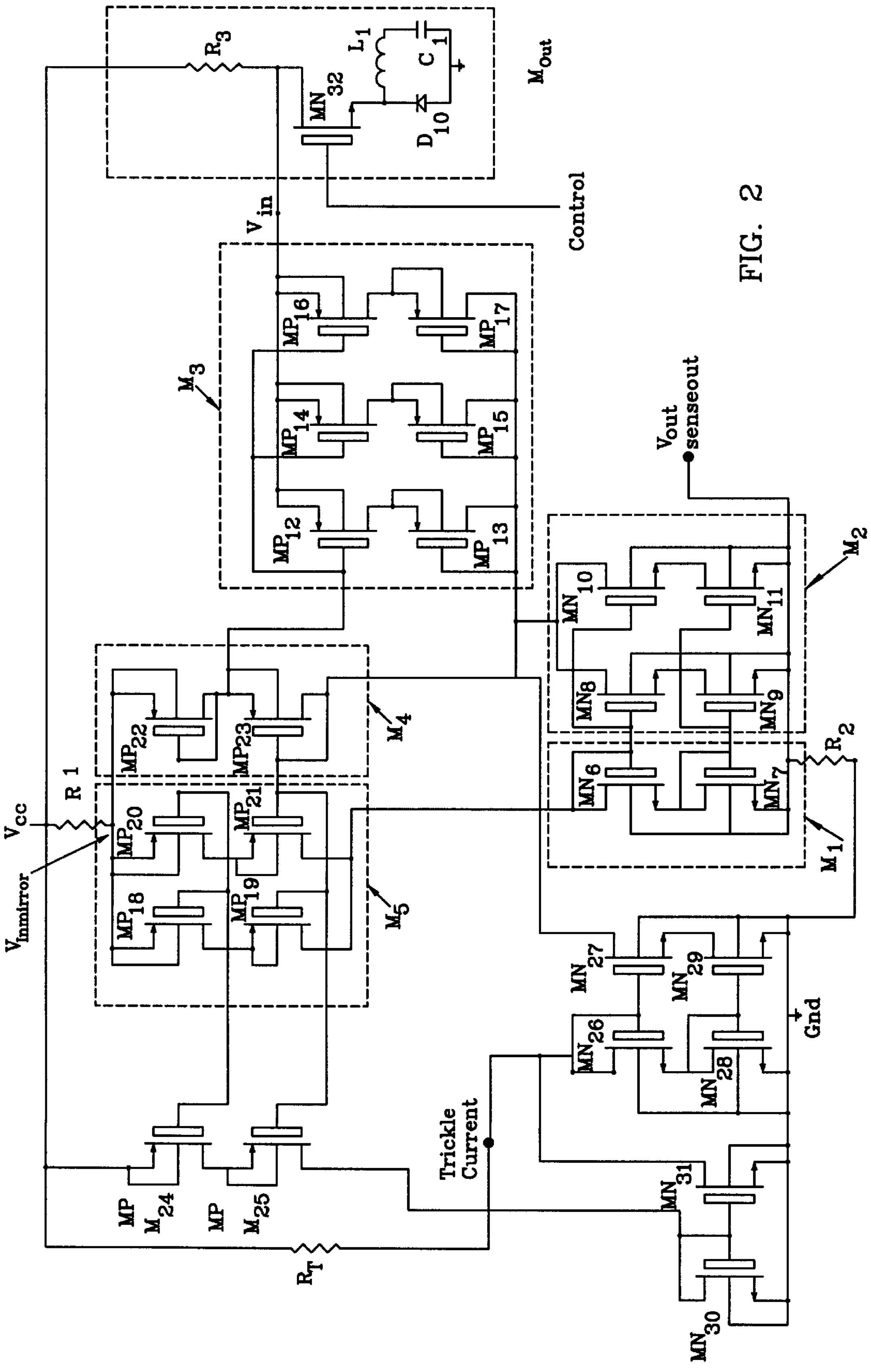
FIG. 2 show a detailed circuit implementing the invention.

FIG. 2 shows the preferred embodiment. All operational components are cascoded, to minimize offset due to variable supply voltage. The equivalent circuits in FIG. 1 are shown in dashed lines.

A trickle current from a current source is introduced in to a startup circuit made up of components MN26–MN29. The trickle current, introduced at the point labeled Trickle Current, may be from any current source, for example, as illustrated, the trickle current may be obtained from Vcc through resistor RT. The trickle current is set at a level lower than the operating current of the circuit path M4/M3-M2 for the overall circuit. Devices MP24, MP25, MN30 and MN31 turn off the trickle circuit once the current reaches a current below the operating current of the circuit, but above the current of M27/M29. The circuit comprised of devices MP24 and MP25 detect the current in the circuit module identified as M5, and shunts the trickle current to ground when the circuit M5 is in operation.

R1 and R2 are constructed of matching resistive material, in this case polysilicon. The following sets of operating devices are closely matched. M7, MN9, MN11; MN6, MN8

MN10; MP18, MP20, MP22, MP12, MP14, MP16; and MP19, MP21, MP23, MP13, MP15, MP17. Devices MP18, MP20, MP22, MP12, MP14, and MP16 are constructed of long channel PMOS components. MN7, MN9 and MN11 are constructed of long channel NMOS components MP19, MP21, MP23, MP13, MP15, and MP19 are high voltage PMOS type components. MN6, MN8, and MN10 are high voltage NMOS components. The components are chosen to minimize any mismatch of current due to lambda effects. The feedback circuit MP24, MP25, MN30 and MN31 should ordinarily be chosen to be at some point lower than the required operating position.

The module labeled M5 is a cascoded circuit that is represented by the single device MP5 in FIG. 1. The use of multiple devices MP18, MP20, MP19 and MN21, mirrored and cascoded, as pointed out above, minimizes spurious current mirrowing due to channel modulation (λ effect). The module M4, representing device MP4 of FIG. 1, is mirrored with module M5, and includes cascoded devices MP22 and MP23.

Module M1 includes devices MN6 and MN7, and forms one half of a mirror circuit that is mirrored with module M2. Module M2, is composed of devices MN8, MN9, MN10 and MN11, and is a cascode circuit forming the other half of the mirrored circuit with M1. Module M2 is the enhanced circuit represented by MN2 in FIG. 1.

Module M3 is part of the input circuit for $V_{in}$, and is formed by cascoded devices MP12–MP17. This module is part of the mirror circuit, and is in equilibrium when $V_{in}=V_{inmirror}$. The combined effect of M3 and M4 is a two current mirror with M5. When $V_{in}>V_{inmirror}$, more current is shunted through M3, reducing the overall circuit current, and therefore the $R_1$ current. This forces the $V_{inmirror}$ voltage up until it matches $V_{in}$. Conversely, when $V_{in}<V_{inmirror}$, less current is shunted through M3, increasing the overall circuit current and therefore the $R_1$ current. This forces the $V_{inmirror}$ voltage down until it matches $V_{in}$.

As an example, $V_{in}$ may be from an output circuit of a switch mode regulator, as represented by module $M_{out}$. Shown is an NMOS device MN32 with its source connected to components $D_{10}$, $C_1$ and $L_1$. $R_3$ supplies current from the supply voltage Vcc.

Figure 3:
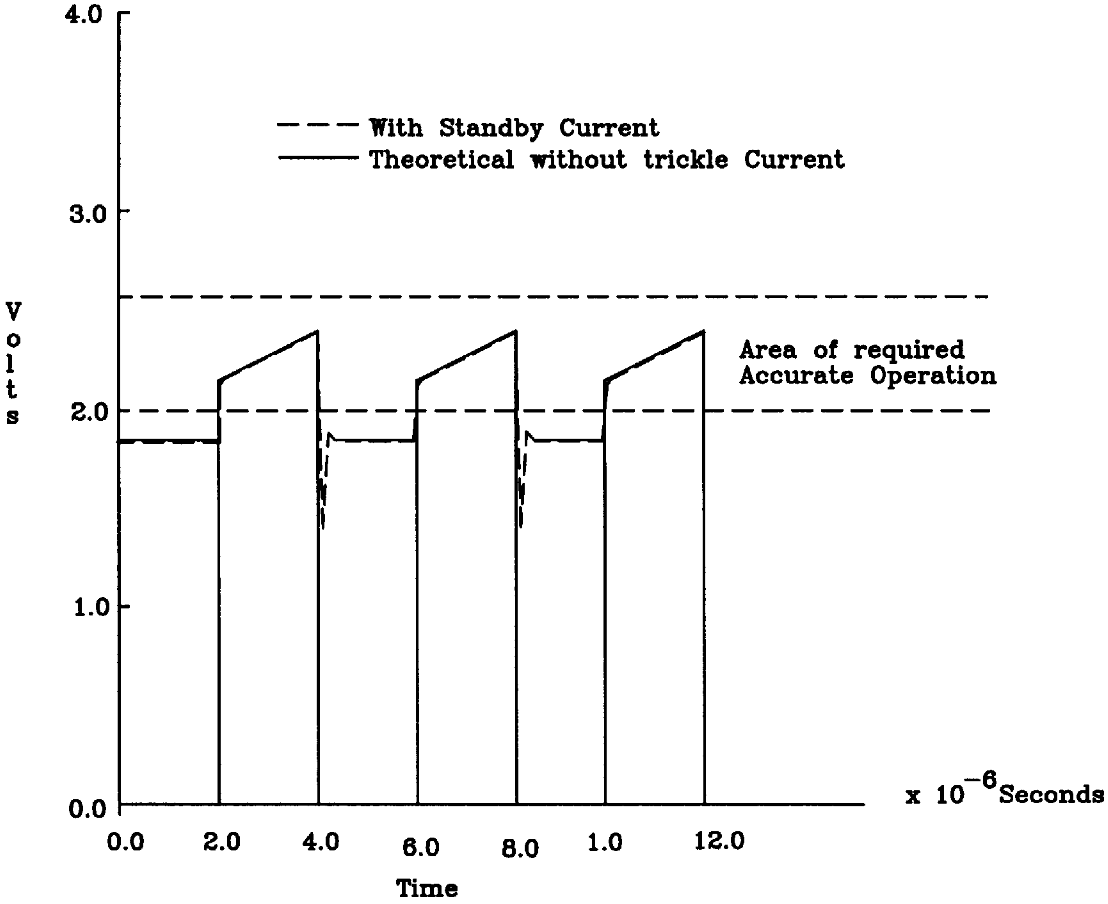
FIG. 3 shows the transient response of a waveforms, theoretical and with standby current for faster response.

FIG. 3 shows a plot of the operating characteristic, with the dashed line being the actual output voltage curve, and the non-dash line being the theoetical curve without trickle current. It is evident that the theoretical curve does not limit below an output voltage of about 1.8 v, as the dashed curve does. This is because the startup circuit is set by the trickle current at a current which translates to a voltage of 1.8 v. In this example, we are interested in detection a voltage at the output of 2.25 v.

What is claimed:

1. A circuit for converting an input voltage which has a voltage level which is very near the voltage level of a supply voltage $V_{cc}$ to an output voltage $V_{out}$ which is a voltage level above a second supply voltage Vgnd, comprising:

an input terminal for receiving said input voltage $V_{in}$;

a diode connected input transistor coupled to said input terminal;

a first current mirror circuit coupled to said diode connected input transistor and producing a current;

a first resistor $R_1$ coupled between said first current mirror and said supply voltage $V_{cc}$ for producing a voltage $V_{in\text{-}mirror}$ which is a mirror value of $V_{in}$;

a second resistor $R_2$ across which output voltage $V_{out}$ is produced;

a second mirror circuit coupled between said first mirror circuit and said second resistor $R_2$ for producing currents in said first and second resistors to provide output voltage $V_{out}$ across $R_2$;

whereby the output voltage $V_{out}$ is an amount above said second supply voltage Vgnd which is proportional to the voltage difference between said input voltage $V_{in}$ and said first supply voltage $V_{cc}$.

2. The circuit according to claim 1, including a start up circuit for initiating current in the first and second mirror circuits.

3. The circuit according to claim 1, including trickle current circuit for initiating current in the first and second mirror circuits.

4. The circuit according to claim 1, including a start up circuit and trickle current circuit for initiating current in the first and second mirror circuits.

5. The circuit according to claim 3, including a shut-down circuit for stopping the trickle current when said mirror circuits have started.

6. The circuit according to claim 1, wherein said first and second resistors are matched resistors.

7. The circuit according to claim 1, where $V_{out}=\frac{2}{3}R_2/R_1\ V_{inmirror}$.

8. A circuit for converting a voltage which is the difference between a supply voltage $V_{cc}$ and input voltage $V_{in}$ which is a voltage very close to the supply voltage $V_{cc}$ to a voltage which is the difference between an output voltage $V_{out}$ and a reference Gnd, comprising:

a diode connnected transistor for receiving the input voltage $V_{in}$;

a first resistor $R_1$ for producing a voltage $V_{In\text{-}mirror}$ in conjunction with $V_{cc}$ which is a mirror value of $V_{in}$;

a second resistor $R_2$ across which $V_{out}$ is produced;

a first mirror circuit coupled to said diode connected transistor and connected with a second mirror circuit, said first and second current mirror circuits being connected between said first resistor and said second resistor for producing currents in said first and second resistor to provide output voltage $V_{out}$; and a trickle current circuit to provide a start up current in said mirror circuits;

whereby the output voltage $V_{out}$ is a voltage above the reference voltage Gnd by an amount proportional to the voltage difference between the supply voltage $V_{cc}$ and the input voltage $V_{in}$.

9. The circuit according to claim 8, including a shut-down circuit for stopping the trickle current when said mirror circuits have started.

10. The circuit according to claim 8, wherein said first and second resistors are matched resistors.

11. The circuit according to claim 8, where $V_{out}=\frac{2}{3}R_2/R_1\ V_{inmirrow}$.

12. A method for converting a voltage which is the difference between a supply voltage voltage $V_{cc}$ and input voltage $V_{in}$, which has a voltage level very close the supply voltage $V_{cc}$ to an output voltage; comprising the steps of:

providing a diode connected input transistor for receiving said input voltage $V_{in}$;

providing a first current mirror circuit coupled to said diode connected input transistor and producing an output current;

providing a first resistor coupled between said supply voltage $V_{cc}$ and said first current mirror circuit for producing a voltage $V_{in}$ mirror which is approximately equal to said input voltage $V_{in}$;

providing a second current mirror circuit coupled to said first mirror circuit;

providing a second resistor coupled between said second mirror circuit and a reference voltage Gnd; and operating said first and second current mirrors and said first and second resistors to produce said output voltage $V_{out}$ which is a voltage level above the reference voltage Gnd that is proportional to the difference between the input voltage $V_{in}$ and the supply voltage $V_{cc}$.

13. The circuit according to claim 12, including the step or providing a start up circuit for initiating current in the first and second mirror circuits.

14. The circuit according to claim 12, including the step of generating a shut-down circuit for stopping the trickle current when said mirror circuits have started.

15. The circuit according to claim 12, wherein said first and second resistors are matched resistors.

* * * * *